April 4, 1950 — A. C. HALL ET AL — 2,502,455
PARACHUTE RELEASE MECHANISM
Filed April 21, 1949 — 2 Sheets-Sheet 1

Inventors
A. C. Hall
H. W. Semon
By M. O. Hayes
Attorney

April 4, 1950 A. C. HALL ET AL 2,502,455
PARACHUTE RELEASE MECHANISM
Filed April 21, 1949 2 Sheets-Sheet 2
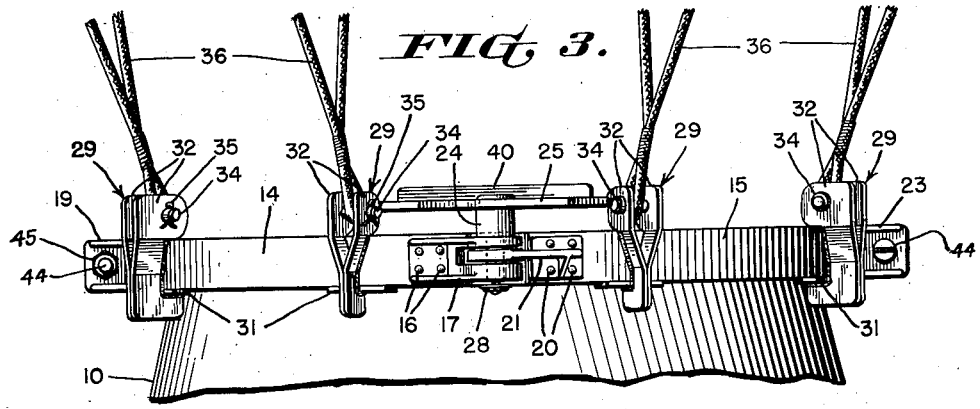
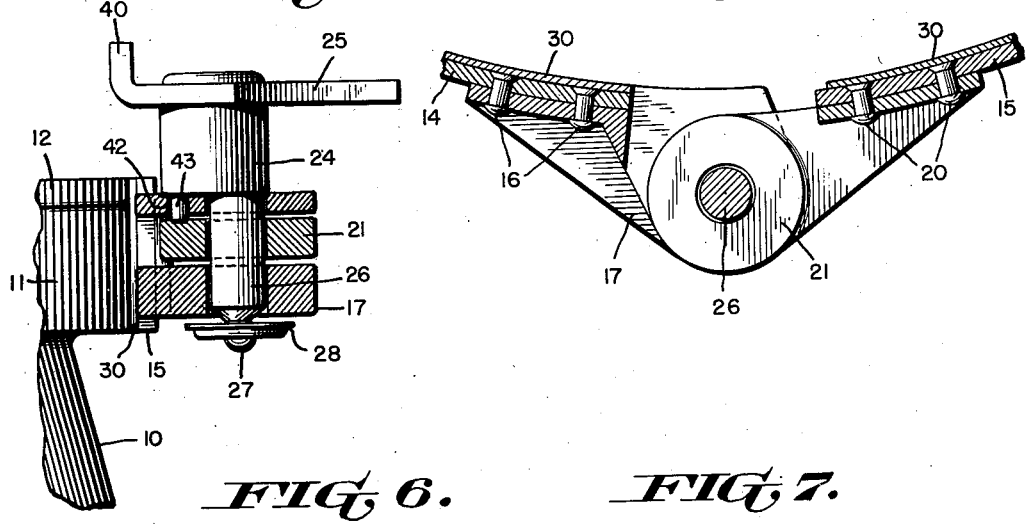
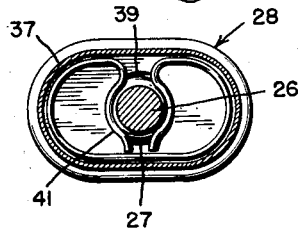
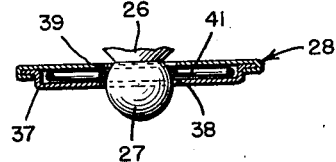
Inventors
A. C. Hall
H. W. Semon
By M. Hayes
Attorney Patented Apr. 4, 1950

2,502,455

UNITED STATES PATENT OFFICE 2,502,455

PARACHUTE RELEASE MECHANISM

Alvin C. Hall, Woodbury, N. J., and Howard W. Semon, Washington, D. C.

Application April 21, 1949, Serial No. 88,872

6 Claims. (Cl. 294—83.1)

(Granted under the act of March 3, 1883, as amended April 30, 1928; 370 O. G. 757)

The present invention relates to a release mechanism for parachutes and more particularly to a paddle actuated parachute release mechanism for use with marine mines adapted to be launched from an aircraft in flight and operable to release the parachute from the mine at the instant of impact of the paddle mechanism with the surface of the water.

Related prior art devices such, for example, as inertia-operated parachute release mechanisms have not proven to be entirely satisfactory in service for the reason that such devices do not operate invariably under all conditions of service.

The paddle release mechanism of the present invention, while of simple construction, accomplishes the release of the parachute from the mine in an instantaneous and positive manner as the mechanism strikes a body of water.

An object of the present invention is to provide a new and improved mechanism operable to release a parachute from a marine mine upon impact of the mechanism with a body of water.

Another object is to provide a parachute release mechanism for a marine mine in which the mechanism is constructed and arranged to release the parachute from the mine in response to the impact of a pair of paddles with the surface of the water.

Still another object is to provide a paddle operated parachute release mechanism having provision for releasably securing the paddles to the mechanism until the instant of impact thereof with the surface of the water and in a manner to prevent the accidental or premature displacement thereof as a result of vibration and shocks received during transportation or launching.

A further object is to provide a parachute release mechanism for aerial launched mines in which surety of operation, durability of construction, and simplicity of design are important features.

An additional object resides in the provision of a paddle type release mechanism wherein the water actuated paddles are so arranged with respect to the mine as to effectively forcibly contact the water as the mine enters thereinto.

Other objects and many of the attendant advantages of this invention will be readily appreciated as the same becomes better understood by reference to the following detailed description when considered in connection with the accompanying drawings wherein:

Fig. 3 is an elevation of either side of the device as shown in Fig. 1, the device being symmetrical;

Fig. 4 is an enlarged vertical sectional view of one of the paddles and associated mechanism;

Fig. 5 is an enlarged horizontal sectional view of one of the releasable joints;

Fig. 6 is a horizontal sectional view of one of the fasteners; and

Fig. 7 is a vertical sectional view of the fastener of Fig. 6.

Figure 1:
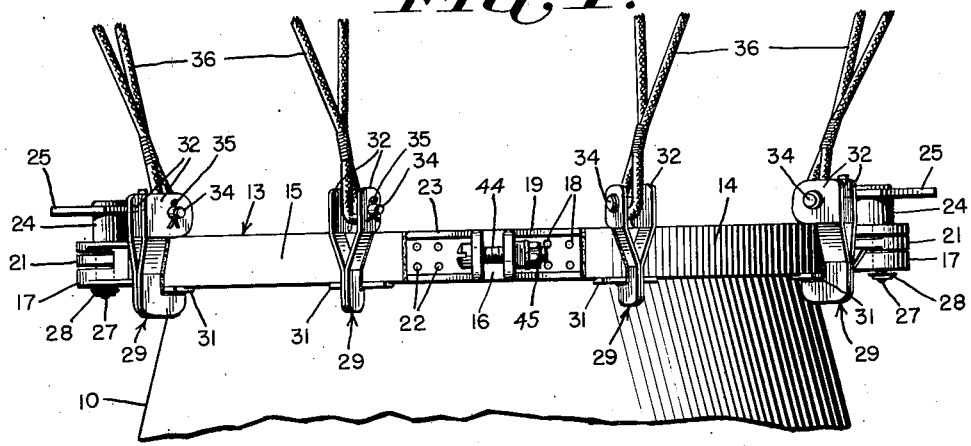
Fig. 1 is a view in elevation of the device of the present invention as applied to an aerial launched marine mine, the mine having been launched and the parachute opened.

Referring more particularly to the drawings in which like reference characters indicate like parts throughout the several views, 10 indicates generally a marine mine adapted to be launched from an aircraft in flight, and having a tail flange 11, Fig. 4. Secured to the flange 11 is a cover plate 12.

The release mechanism of the present invention is indicated generally at 13 and is releasably fastened to the flange 11 as will be hereinafter more fully described. A clamping ring comprising a plurality of straps 14 and 15 is fastened about the tail flange 11. Each of the straps 14 has secured at one end thereof by means of rivets 16 an eye member 17 and at the other end thereof by means of rivets 18 a clamping bracket 19. Each of the straps 15 has secured thereto by rivets 20 an eye member 21 at one end thereof and by rivets 22 a clamping bracket 23 at the other end thereof.

A pin 24 passes through each of the pairs of eye members 17 and 21. Each of the pins 24 has secured to one end and at a right angle to the axis thereof a plate 25, the other end being reduced and offset as at 26 and formed with a ball-shaped end 27 adapted to receive a snap fastener 28 of a well known variety.

The pairs of clamping brackets 19 and 23 are joined by means of bolts 44 and nuts 45. In this manner straps 14 and 15 may be drawn up tightly around flange 11 of mine 10.

Interposed between flange 11 and straps 14 and 15 are a pair of leaf spring members 30.

Mounted in substantially circumferential equidistance on the straps 14 and 15 are a plurality of clevis lugs 29.

The lugs 29 are secured to straps 14 and 15 preferably by welding or brazing. Each of the lugs 29 has a flange engaging face 31 and a pair of ears 32 having bores to receive headed pins 34, the pins 34 being held against displacement by cotter pins 35.

Ears 32 and pins 34 are arranged to receive shroud lines or risers 36 of a parachute (not shown).

It will be noted that each of the fasteners 28 as shown in Figs. 6 and 7 comprises a hollow metallic casing 37 having aligned openings 38 and 39 in the walls thereof. A gripping spring 41 is positioned within the casing 37 in such a manner as to grip the ball-shaped end 27 of pin 24 as it is forced through the openings 38 and 39. This arrangement is particularly desirable under conditions of service where shear wires and pins have been found to be not suitable because of premature breakage of the wires or pins due to vibration. It has been found that fastener 28 is entirely satisfactory under all conditions of service.

Figure 2:
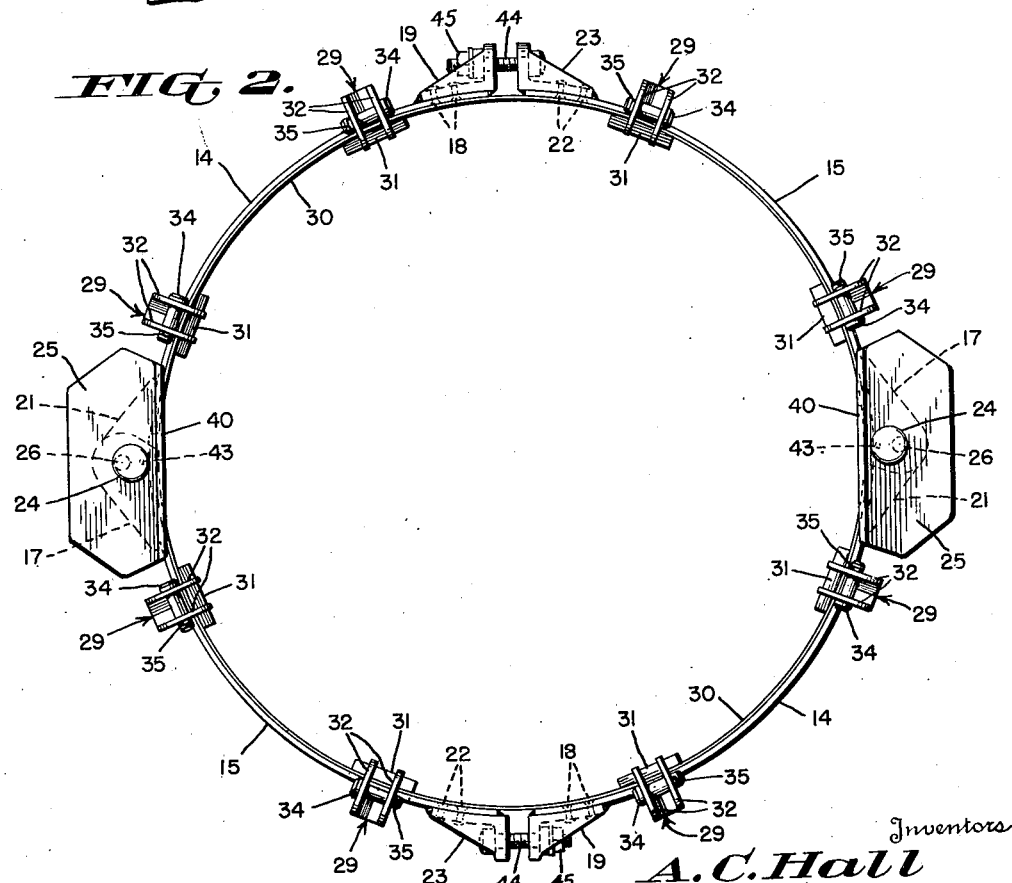
Fig. 2 is a plan view of the device per se.

As best illustrated in Fig. 2, plate 25 is generally of rectangular configuration and preferably is strengthened as by the flange 40 to resist deformation due to the force of impact of the water thereon. The precise shape of plate 25 is not important as long as the effective area of contact of the plate with the water forcibly striking thereagainst is sufficient to cause removal of the snap fastener and withdrawal of the pin from the eye members 17 and 21.

It will be noted that the plane of the clamping ring and of the plates 25 is generally perpendicular to the line of flight of the mine, and that the plates are arranged generally tangentially to the periphery of the clamping ring. As a result of this arrangement, an effective water contact area of each plate as defined by that portion of the plate surface area lying between the outer full line edges and the dashed line 21 or 17 (Fig. 2) is provided which is arranged outside the peripheral limits of the tail end portion of the mine and in a direct path of the water as the mine enters therein.

Plates 25 preferably are each secured in the aforedescribed position against rotation about the axis of its supporting pin 24 by a cylindrical key or dowel pin 43 which is secured to, and also is offset with respect to, the axis of pin 24 and which is arranged to be received into an opening 42 provided therefor in eye member 17 when the parts are assembled as in Fig. 4, thereby to lock the plates in operative position against rotation.

In operation, assuming that the mine has been launched from an aircraft in flight and the parachute is open, as the mine enters a body of water the plates 25, through the action of the water thereagainst, pull pins 24 through eyes 17 and 21, at the same time dislodging fasteners 28 therefrom. When pins 24 are withdrawn from eyes 17 and 21 springs 30 force release mechanism 13 away from flange 11 of mine 10, thus releasing the parachute from the mine.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed and desired to be secured by Letters Patent of the United States is:

1. Apparatus for releasing a parachute from an aerial launched mine as the mine enters a body of water comprising, in combination, a mine having a tail flange, a sectional strap member surrounding said tail flange and having means for securing said parachute thereto, clamping means for joining certain abutting ends of the sections of said strap member, releasable means for joining certain other abutting ends of the sections of said strap member, said releasable means having a pair of paddles constructed and arranged to be forcibly contacted by the water and released thereby from said other ends of the sections thereby to effect the release of the sections as the mine enters a body of water, and spring means arranged to force the strap member sections laterally away from the mine after the release thereof thereby to release the parachute from the mine.

2. Apparatus for releasing a parachute from an ordnance device comprising, in combination, a separable quadripartite strap member having clamping and separable fastening means for releasably securing the member together as a unit, a plurality of lugs secured to said strap member and having the shroud lines of the parachute respectively attached thereto, said strap member being so constructed and arranged as to be clamped to said ordnance device when assembled as a unit thereabout, paddle members secured to said separable fastening means and adapted to effect the release thereof from the member upon impact of the water with the paddle members as the device enters a body of water, and spring members arranged to urge the strap member away from the ordnance device upon release of said fastening means.

3. Apparatus for releasing a parachute from an ordnance device comprising, in combination, a plurality of strap members, a plurality of lugs secured to the strap members and having the shroud lines of the parachute respectively attached thereto, clamping means for securing certain ones of said strap members together and for clamping the members as a unit around the ordnance device, pairs of eye members on adjacent ends of certain other ones of said strap members, pins for releasably joining said pairs of eye members together, plates attached to said pins and arranged to receive the force of impact of the water thereon as the ordnance device strikes a body of water and to withdraw the pins from the eye members by the force of the water on the plates, and spring members arranged to force the apparatus away from the ordnance device as the pins are released thereby to release the parachute from the mine.

4. Apparatus for releasing a parachute from an aerial launched mine comprising, in combination, a plurality of strap members including means for securing said parachute thereto, means for clamping said strap members around said mine, releasable means for connecting certain ones of said strap members and including a plurality of paddles constructed and arranged to operate said releasable means in response to the force of impact of the water on the paddles as the mine strikes a body of water, spring members for forcing the apparatus from the mine as the releasable means is released, and means including a plurality of fasteners for releasably securing said paddles to said strap members in predetermined lateral spaced relation with respect to the mine.

5. Apparatus for releasing a parachute from an aerial launched marine mine comprising, in combination, a sectional ring member, a plurality of lug members attached in circumferential equidistance to said sectional ring member and having shroud lines of the parachute respectively secured thereto, a clamping bracket attached to one end of each of the ring member sections, a plurality of clamping bolts, said ring member being arranged with adjacent pairs of the clamping brackets and each pair joined by one of said clamping bolts, an eye member attached to the other end of each of the ring member sections, a plurality of pins respectively adapted to fasten adjacent ring members together, each of the pins having a reduced offset end terminating in a ball-shaped enlargement, a fastener adapted to fit over said ball-shaped end of each of said pins and having a gripping spring therein for gripping said ball-shaped end thereby to prevent accidental displacement of said pins, a plate member secured to the opposite end of each of the pins and at right angles to the axis thereof and in predetermined laterally extending relation with respect to the mine whereby the plates receive the force of impact of the water as the mine enters a body of water thereby withdrawing the pins from the eye members, dowel means on each pin for releasably retaining the plates in said predetermined relation, and leaf spring members interposed between said sectional ring member and the mine to force the apparatus away from the mine as the pins are withdrawn from the eye members thereby to release the parachute from the mine.

6. Apparatus for releasing a parachute from a mine as the mine enters a body of water comprising, a clamping ring releasably secured to said mine and having lugs for attaching the shroud lines of the parachute thereto, means including a pair of impact operative paddles for releasing said clamping ring from the mine as the mine enters the body of water thereby to separate the parachute from the mine, and means for preventing operation of said releasing means prior to the entrance of the mine into the body of water.

ALVIN C. HALL.
HOWARD W. SEMON.

No references cited.